Nov. 8, 1949   M. H. GROVE ET AL   2,487,650
PRESSURE REGULATOR
Filed Aug. 29, 1947   2 Sheets-Sheet 1
FIG_1_
FIG_2_
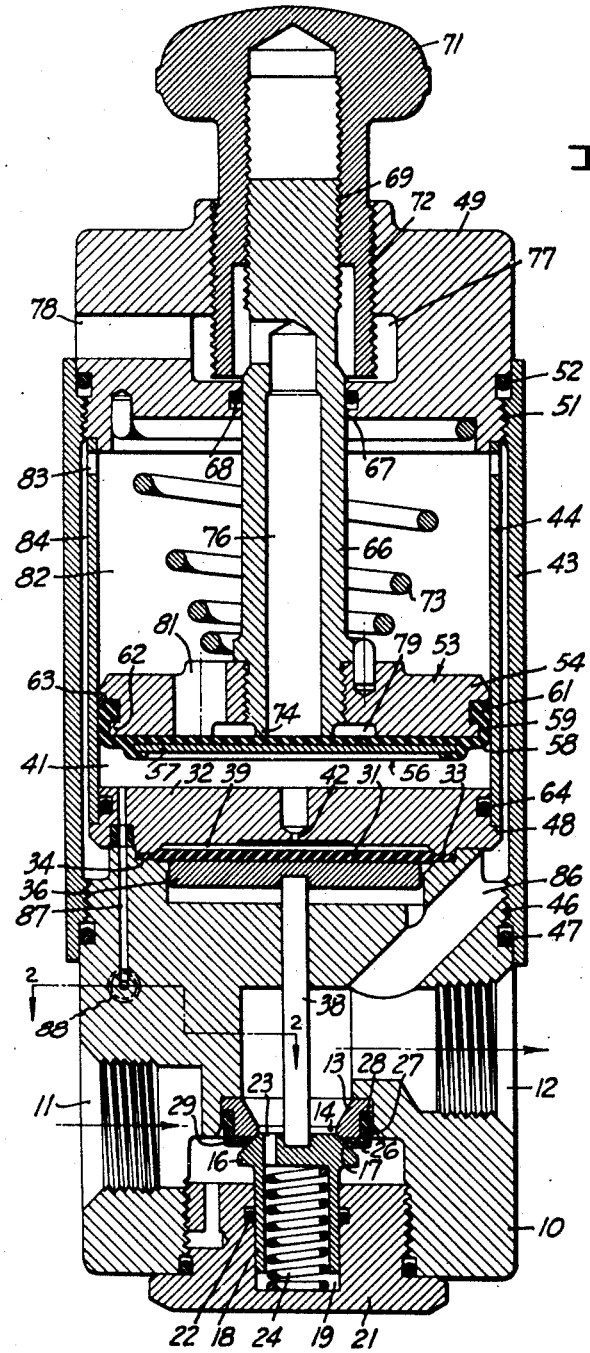
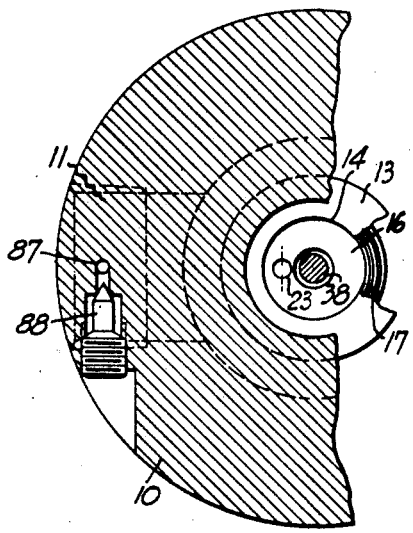
INVENTORS
Marvin H. Grove
BY Austin U. Bryant
ATTORNEYS

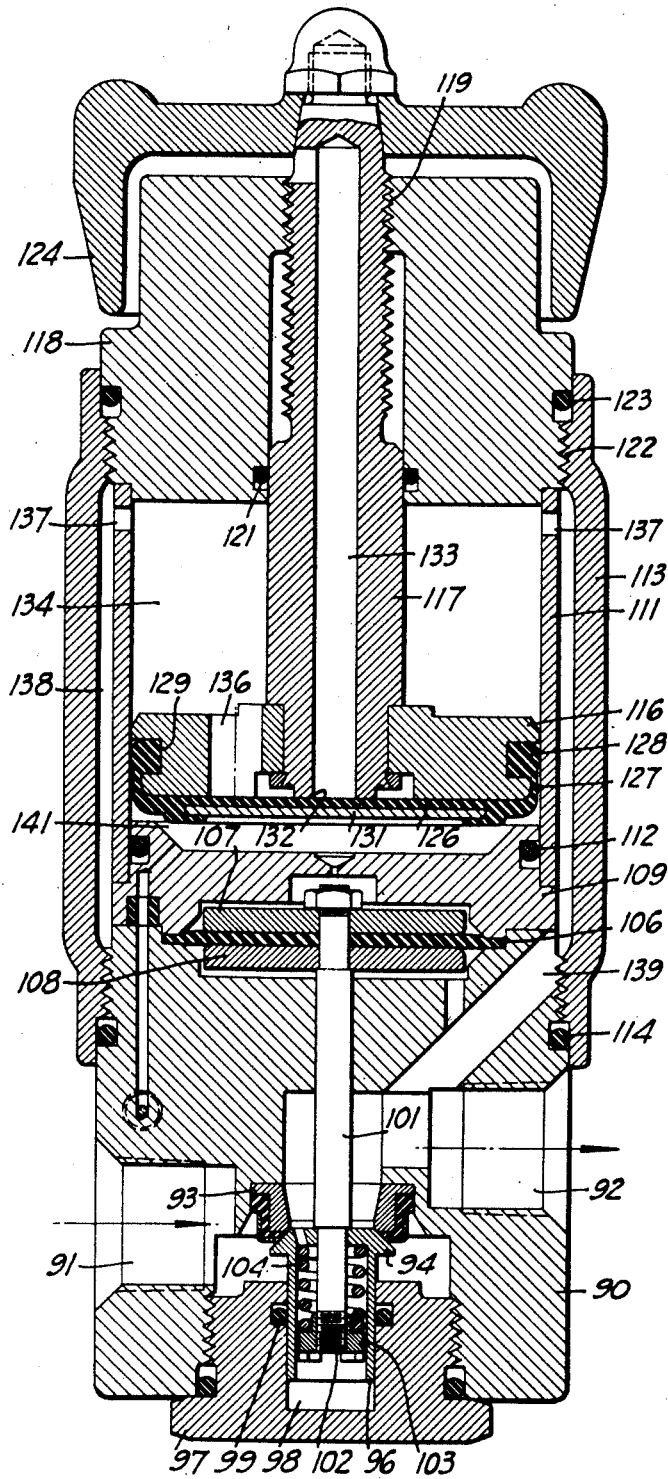
FIG_3_
INVENTORS
Marvin H. Grove
Austin U. Bryant
BY
ATTORNEYS

Patented Nov. 8, 1949

2,487,650

UNITED STATES PATENT OFFICE 2,487,650

PRESSURE REGULATOR

Marvin H. Grove, Piedmont, and Austin U. Bryant, Berkeley, Calif., assignors to Fluid Control Engineering Co., a partnership consis'ing of Marvin H. Grove and Julia E. Grove, both of Piedmont, Calif.

Application August 29, 1947, Serial No. 771,256

5 Claims. (Cl. 50—21)

This invention relates generally to devices employed for effecting automatic control of fluid flow. It is particularly applicable for pressure reducing regulators where it is desired to reduce fluid pressure from a high pressure system to a predetermined low pressure value.

It is an object of the invention to provide a regulating means of the above character which incorporates both pressure reducing and pressure relief means in a novel simplified combination.

Another object of the invention is to provide a novel form of pressure reducing regulator which can be adjusted over a relatively wide range of outlet pressures.

A further object of the invention is to provide a novel combined pressure reducing and relief device which enables adjustment of the outlet pressure over a relatively wide range while simultaneously and automatically setting the pressure relief valve.

Additional objects of the invention will appear from the following description in which the preferred embodiment has been set forth in detail in conjunction with the accompanying drawing.

Referring to the drawing:

Figure 1 is a side elevational view in section illustrating a pressure reducing regulator incorporating the present invention.

Figure 2 is a cross-sectional detail taken along the line 2—2 of Figure 1.

Figure 3 is a side elevational view in section illustrating another embodiment of the invention.

In the past commercial pressure reducing regulators of the Grove type (see Patent 2,047,101) have utilized gas under pressure acting upon one side of a diaphragm for the purpose of loading the diaphragm for a given outlet pressure. The Grove type regulator can be adjusted to vary the outlet pressure by changing the gas loading pressure. Generally this is accomplished by bleeding in a certain amount of gas into the dome or chamber above the diaphragm, or by permitting air to vent out in the event the pressure is to be reduced.

A pressure reducing regulator of the Grove type can be combined in a novel manner with a pressure relief valve as shown in co-pending application Serial No. 586,136, filed April 2, 1945. In that instance a gas pressure loaded relief valve is connected with the outlet passage of the regulator. The loading chamber of the relief valve is connected to the loading chamber of the regulator, whereby the relief valve is automatically set to vent fluid from the outlet side of the regulator in the event an outlet pressure is attained considerably above that for which the regulator is set. This novel combination is particularly advantageous in that upon changing the setting of the regulator, by increasing or decreasing the loading pressure, the pressure relief valve is reset automatically.

The present invention consists of a regulator which likewise incorporates a pressure relief valve, but the present invention incorporates novel means enabling a change in the setting of the regulator without introducing or venting gas from the pressure chamber.

The preferred form of the invention illustrated in the drawing consists of a body 10 provided with inflow and outflow passages 11 and 12. A seat ring 13 is mounted within the body, whereby the orifice 14 through this ring communicates between the inlet and outlet passages. A movable valve member 16 cooperates with the seat ring 13, and is shown provided with a conical valve surface 17.

In the particular embodiment illustrated the valve 16 is substantially balanced with respect to the pressures acting upon the same. Thus it is attached to one end of a sleeve 18 which fits like a piston in a cylindrical bore 19, formed in the closure plug 21. Suitable sealing means such as the resilient O ring 22 prevents leakage past the sleeve 18. Port 23 serves to vent the interior of sleeve 18 with the outlet side of the seat. A light compression spring 24 normally urges the valve toward closed position.

In the particular embodiment illustrated fluid tight sealing engagement between the valve member and the seat is aided by the use of a relatively thin disc 26 formed of suitable resilient material such as natural or synthetic rubber. This disc is shown provided with a rim 27 which fits snugly about the lower portion of the ring 13, and also with a sealing bead 28. A small metal cap 29 serves to retain the disc 26 in operative position.

The body serves to mount a main operating diaphragm 31 made of suitable flexible material such as natural or synthetic rubber. A rigid plate 32 extends over the diaphragm 31, and is provided with an annular clamping shoulder 33, which together with the annular shoulder 34 formed on the body serves to clamp and grip the outer peripheral edge portion of the diaphragm. The lower side of the diaphragm 31 is engaged by the rigid diaphragm plate 36, which is operatively connected by a thrust rod 38 with the valve member 16 as illustrated. The relatively small space or clearance 39 between the upper surface of diaphragm 31 and the lower surface of plate 32, is in restricted communication with the space or chamber 41 above the plate 32, through the restricted orifice 42. It may be explained at this point that the plate 32 in conjunction with the restricted orifice 42 corresponds to the plate 58 and orifice 62 of Patent 2,047,101, and that this arrangement prevents uncontrolled fluttering or chattering of the diaphragm and valve.

In the usual Grove type of pressure reducing regulator, the "dome plate" corresponding to plate 32 is pressed into a recess provided in the overlying dome, and this dome is in turn clamped by bolts to the body of the regulator. In the present instance a completely different type of mounting is provided for the plate 32, and for holding this plate in clamping position with respect to the diaphragm 31. Thus mounted upon the body there is a tubular shell 43 and within this shell there is a tubular sleeve 44. Shell 43 is suitably secured to the body as by means of the threaded connection 46, and suitable means such as the resilient O ring 47 is provided to seal this connection against leakage. The lower end of the inner sleeve 44 seats upon the annular shoulder 48 provided on the periphery of plate 32, and its upper end is engaged by a bonnet 49 which has a threaded connection 51 with shell 43. Leakage through connection 51 is likewise prevented by suitable sealing means such as a resilient O ring 52.

Fitted within the sleeve 44 there is a piston assembly 53. This includes the disc-like member 54 formed of a suitable metal or other rigid material, in conjunction with a second fluid operated diaphragm 56. The diaphragm 56 is preferably formed of suitable resilient material such as natural or synthetic rubber. Its major central area is stiffened as by means of the relatively rigid metal disc 57, which is vulcanized or bonded to the rubber. The resilient peripheral portion 58 of the diaphragm permits limited diaphragm movements as will be presently explained. The peripheral margin of the diaphragm is provided with a rim 59 and a ring-like beaded edge 61. Rim 59 fits over an annular shoulder 62 formed on member 54, and bead 61 is accommodated in an annular groove 63 in the member 54. Normally sufficient radial "squeeze" or pressure is applied to bead 61 to provide a seal between the piston and the sleeve 44. Likewise the engagement between plate 32 and the lower end of the sleeve 44 is sealed as by means of resilient O ring 64. It will be noted that the outer face of the beaded edge 61 is rounded, while the inner face has a right angle shoulder which engages the upper face of the piston shoulder 62.

Member 54 of the piston assembly is attached to one end of the operating rod 66, which extends upwardly through an opening 67 in the bonnet 49. Leakage between these parts is prevented by suitable sealing means such as the resilient O ring 68. The upper end of rod 66 has a threaded engagement 69 with the operating knob 71. This knob also has a threaded engagement 72 with the bonnet 49. These engagements are right and lefthand threaded, whereby travel is imparted to the rod 66 and the piston upon rotation of the knob 71.

Suitable means is provided to prevent rotation of the piston assembly upon rotation of the knob 71. Thus a coil spring 73 surrounds the rod 66, and has its one end anchored to member 54 of the piston assembly, and its other end anchored to the bonnet 49.

Relief valve means is associated with the second diaphragm 56. This relief valve means consists of an annular seat 74 which is formed on the lower end of the rod 66. A passage 76 in the rod 66 extends from the orifice of this seat to the recess 77 in bonnet 49, which in turn connects with the vent duct 78. A recess 79 is formed in the member 54 above the seat 74 and is connected by duct 81 with the space 82 above the piston assembly. Space 82 is in turn in communication with the outlet passage 12 of the regulator, through ports 83 in the upper part of the sleeve 44, space 84 between this sleeve and the outer shell 43, and the duct 86.

For a reason presently to be explained it is desirable to provide means for manually bleeding off air from the space 41 between the piston assembly and plate 32. Thus a small duct 87 leads from the space 41 to the needle valve 88. Upon manually opening this valve a desired amount of gas can be bled from the space 41, or the pressure in this space can be equalized with atmospheric pressure.

Operation of the regulator described above is as follows: It will be assumed that inlet passage 11 is connected to a high pressure gas system, and outlet 12 connected to a low pressure system. The piston assembly is initially moved to the upper end of its travel by turning knob 71, and then the space 41 below the piston is brought to atmospheric pressure by opening the needle valve 88. After this needle valve has been closed, knob 71 is turned to advance the piston assembly and thus to compress the air in space 41. As the air pressure in space 41 increases the outlet pressure increases accordingly. Assuming that one has a pressure gauge connected to the outlet passage, knob 71 can be turned to a position which will give the desired pressure value. In a valve of this type the outlet pressure is invariably slightly less than the pressure in the chamber 41. Therefore the pressure in space 41 is adequate to hold the diaphragm 56 closed upon the seat 74. In the event through some faulty or abnormal condition, such as failure of the main valve 16 to seat properly, the outlet pressure rises to a value substantially greater than the pressure in chamber 41, such outlet pressure applied to the upper side of diaphragm 56 causes this diaphragm to be opened with respect to seat 74, thus permitting outlet pressure to vent to the atmosphere through passage 76, recess 77 and duct 78. Likewise if the setting of the regulator is reduced by retracting the piston assembly, pressure in chamber 41 may be reduced to such a value as to automatically cause venting of gas from the outlet side of the regulator, thus tending to reduce outlet pressure to a value not greatly in excess of the new outlet pressure for which the regulator is set.

Figure 3 illustrates another embodiment of the invention. In this instance the body 90 is provided with inlet and outlet passages 91 and 92, and a removable seat ring 93 similar to the ring 13 of Figure 1. Valve member 94 engages the seat ring, and is attached to the piston-like member 96. The body closure plug 97 has a cylindrical bore 98 to receive sleeve 96, and the fit between these parts is sealed by suitable means such as the resilient O ring 99. The operating rod 101 for the valve member 94 has an end portion 102 which slidably extends through a central opening provided in the valve member, and the lower end of extension 102 is provided with a nut 103 which engages the lower end of the compression spring 104. The upper end of rod 101 is attached to the flexible fluid pressure operated diaphragm 106. The diaphragm assembly includes the upper and lower rigid diaphragm plates 107 and 108, which in turn are secured to and clamped together by the upper end of rod 101. The rigid plate 109 overlying the diaphragm is similar to the plate 32 of Figure 1. It is held in place on the body by the tubular sleeve 111 and is sealed with respect to the sleeve by the resilient O ring 112.

The tubular sleeve 111 is within the outer tubular shell 113. The lower end of the latter has a threaded engagement with the body and this engagement is sealed by the O ring 114. The piston 116 is fitted within the tubular sleeve 111 and is loosely carried upon the lower or inner end of the rod 117. Rod 117 extends to the exterior through the closure bonnet 118, and has a simple threaded engagement 119 with the same. Leakage between the rod and the bonnet 118 is prevented by suitable sealing means such as the resilient O ring 121. The bonnet has a threaded engagement 122 with the upper end of the shell 113, and leakage between these parts is prevented by suitable means such as the resilient O ring 123. Likewise the bonnet 118 engages the upper end of the inner tubular sleeve 111, thus forcing this sleeve downwardly against the rigid plate 109. The exterior end of the operating rod 117 carries a hand operating wheel or knob 124.

The body of the piston 116 is provided with a resilient diaphragm 126. A peripheral portion 127 of this diaphragm forms in effect a rim, which is provided with a resilient sealing bead 128. The bead is accommodated within the annular groove 129 of the piston, and it will be noted that the inner peripheral portion of the bead is provided with right angle corners which completely fill the corners of the recess, whereas the outer peripheral portion of the bead presents a rounded or arcuate face for engagement with the inner surface of the tubular sleeve 111. The bead is placed under sufficient radial pressure to properly seal against the pressures involved. A rigid metal disc 131 is bonded to the resilient diaphragm in substantially the same manner as the rigid disc 57 of Figure 1.

As in Figure 1 the exterior face of the diaphragm 126 engages the valve seat 132 formed on the lowermost or inner end of the operating rod 117. Passage 133 extends from seat 132 through the rod 117 and at it upper end is vented to the atmosphere. The space surrounding the seat 132 is in free communication with the space 134 through duct 136, and this space in turn is in communication with the outlet 92 by port 137, space 138 between the tubular sleeve 111 and the outer shell 113, and ports 139 in the valve body.

Operation of the pressure reducing regulator illustrated in Figure 3 is substantially the same as that of Figure 1. The loading pressure in space 141 can be adjusted by turning the operating knob 124, which in turn determines the position of the piston 116. As previously explained this serves to automatically adjust the outlet pressure, and also the pressure for which the relief valve is set to open. There is a direct attachment in this instance between the operating diaphragm 106 and the valve member 94. These parts together with the rod 101 are proportioned or adjusted in such a fashion that when the diaphragm 106 is forced upwardly to its extreme limiting position by outlet pressure below the same, the spring 104 is compressed by a small amount of lost motion between rod 101 and valve member 94. For normal operation of the regulator when the valve member 94 is partially or fully open, the valve member is held in fixed relationship with respect to the operating rod by the compression spring.

We claim:

1. In a fluid flow control device, a body having inflow and outflow passages and a valve seat disposed between the passages, a movable valve member cooperating with the seat, a fluid pressure operated diaphragm carried by the body and adapted to actuate the valve member, means forming a cylinder on one side of the diaphragm, a piston movably fitted in the cylinder to thereby form between the piston and the diaphragm a closed chamber adapted to contain gas under pressure to provide loading force upon the diaphragm, said piston incorporating a second fluid pressure operated diaphragm, and relief valve means associated with the exterior face of said last named diaphragm, the inlet side of said pressure relief valve means having a fluid connection with said outlet passage.

2. In a fluid flow control device, a body having inflow and outflow passages and a stationary valve seat between the passages, a movable valve member cooperating with the seat, a fluid pressure operated diaphragm carried by the body and adapted to actuate the valve member, a cylinder extending from one side of the diaphragm, a piston fitted in the cylinder and serving to form in conjunction with the cylinder a closed gas chamber on one side of the diaphragm to provide loading force upon the latter, a flexible diaphragm carried by the inner face of the piston, and pressure relief valve means associated with the exterior face of the diaphragm, said last named means comprising a valve seat carried by the piston and adapted to be normally engaged by the exterior face of the second diaphragm, an area of the second diaphragm surrounding said seat being in communication with the outlet passage, the orifice of the valve seat being vented to the atmosphere, said pressure relief valve means serving to vent fluid from the discharge side of the device in the event the outlet pressure rises above that for which the device is set.

3. In a pressure reducing regulator, a body having inflow and outflow passages and a valve seat between the passages, a movable valve member cooperating with the seat, a fluid pressure operated diaphragm carried by the body and adapted to actuate the valve member, one side of said diaphragm being exposed to the outflow pressure, a cylinder on the other side of the diaphragm, a piston fitted in said cylinder and serving to form in conjunction with the cylinder a closed chamber on said other side of the diaphragm adapted to contain gas under pressure to provide loading force for the first named diaphragm, said piston including a second fluid pressure operated diaphragm having a flexible peripheral edge of the same in sealing contact with the inner side walls of the cylinder, and pressure relief valve means carried by the piston and having the inlet side communicating with the outflow passage of the regulator, said pressure relief valve means comprising a valve seat carried by the piston and normally in sealing engagement with the exterior face of the second diaphragm, the exterior area of the second diaphragm surrounding said seat being exposed to the pressure on the inlet side of the relief valve, the orifice surrounded by said seat being in communication with the atmosphere.

4. A pressure reducing regulator as in claim 3 together with means adapted to be manually operated for adjusting the position of the piston and to thereby adjust the outflow pressure of the regulator.

5. In a flow control device, a body having inflow and outflow passages and a valve seat between the passages, a movable valve member cooperating with the seat, a fluid pressure operated diaphragm adapted to actuate the valve member, a cylinder provided on one side of the diaphragm, a piston fitted in the cylinder and forming in conjunction with the cylinder a closed gas chamber on one side of the diaphragm, said piston comprising a second diaphragm, said second diaphragm having a peripheral edge portion formed of flexible material with a bead upon its outer peripheral edge, the piston being provided with a groove to receive said bead whereby said bead serves to effectively seal between the piston and the cylinder, and pressure relief valve means carried by the piston and having the inlet side communicating with the outflow passage of the regulator, said pressure relief valve means comprising a valve seat carried by the piston and normally in sealing engagement with the interior face of the second diaphragm, the exterior area of the second diaphragm surrounding said seat being exposed to the pressure on the inlet side of the relief valve, the orifice surrounded by said seat being in communication with the atmosphere.

MARVIN H. GROVE.
AUSTIN U. BRYANT.

REFERENCES CITED

The following references are of record in the file of this patent:

UNITED STATES PATENTS

| Number | Name | Date |
|---|---|---|
| 466,275 | Fasoldt | Dec. 29, 1891 |
| 2,147,850 | MacLean | Feb. 21, 1939 |
| 2,195,242 | Dow | Mar. 26, 1940 |